(12) United States Patent
Ko et al.

(10) Patent No.: US 11,180,002 B2
(45) Date of Patent: Nov. 23, 2021

(54) AIR VENTS FOR VEHICLE INTERIOR

(71) Applicant: GRAMMER INTERIOR COMPONENTS GMBH, Hardheim (DE)

(72) Inventors: Wanhyun Ko, Halle (DE); Christian Schreck, Koenigheim (DE)

(73) Assignee: GRAMMER Interior Components GmbH, Hardheim (DE)

( * ) Notice: Subject to any disclaimer, the term of this patent is extended or adjusted under 35 U.S.C. 154(b) by 179 days.

(21) Appl. No.: 16/118,563

(22) Filed: Aug. 31, 2018

(65) Prior Publication Data
US 2019/0070935 A1    Mar. 7, 2019

(30) Foreign Application Priority Data

Sep. 1, 2017 (DE) .......................... 102017120208.0

(51) Int. Cl.
| | |
|---|---|
| *B60H 1/34* | (2006.01) |
| *F24F 13/14* | (2006.01) |
| *B63J 2/04* | (2006.01) |
| *B64D 13/06* | (2006.01) |

(52) U.S. Cl.
CPC ........... *B60H 1/345* (2013.01); *B60H 1/3421* (2013.01); *F24F 13/1413* (2013.01); *B60H 2001/3471* (2013.01); *B63J 2/04* (2013.01); *B64D 2013/0625* (2013.01)

(58) Field of Classification Search
CPC .................. B60H 1/345; B60H 1/3421; B60H 2001/3471; F24F 13/1413; B63J 2/04; B64D 2013/0625
USPC .......................................................... 454/155
See application file for complete search history.

(56) References Cited

U.S. PATENT DOCUMENTS

| | | | |
|---|---|---|---|
| 3,648,590 A | 3/1972 | Mercier | |
| 2015/0328958 A1* | 11/2015 | Winget, Jr. | .......... B60H 1/3414 454/155 |

FOREIGN PATENT DOCUMENTS

| | | |
|---|---|---|
| DE | 102011120877 A1 | 6/2013 |
| DE | 102012015519 A1 | 2/2014 |
| DE | 202014103672 U1 | 12/2015 |
| DE | 202004015522 U1 | 7/2016 |
| DE | 202016103388 U1 | 7/2016 |
| JP | 2002293133 A | 10/2002 |
| JP | 201713613 A | 1/2017 |

(Continued)

*Primary Examiner* — Allen R Schult
(74) *Attorney, Agent, or Firm* — Von Rohrscheidt Patents

(57) ABSTRACT

An air vent for a vehicle interior, the air vent including a master lamella and plural slave lamellas that are respectively pivotable about an axis, wherein the plural slave lamellas follow an opening movement of the master lamella and are arrangeable at different angles relative to the master lamella in order to generate a diffuse air flow; an open portion which is defined by a plurality of lamellas including the master lamella and the plural slave lamellas with a respective flow out gap arranged between each of the lamellas so that air moves through the respective flow out gap into the vehicle interior; and at least one actuation element that is configured to control an orientation of the lamellas, wherein any one of the lamellas is selectable as the master lamella wherein an opening movement of the plural slave lamellas follows an opening movement of the master lamella.

12 Claims, 10 Drawing Sheets

(56) References Cited

FOREIGN PATENT DOCUMENTS

JP 2017149307 A 8/2017

* cited by examiner

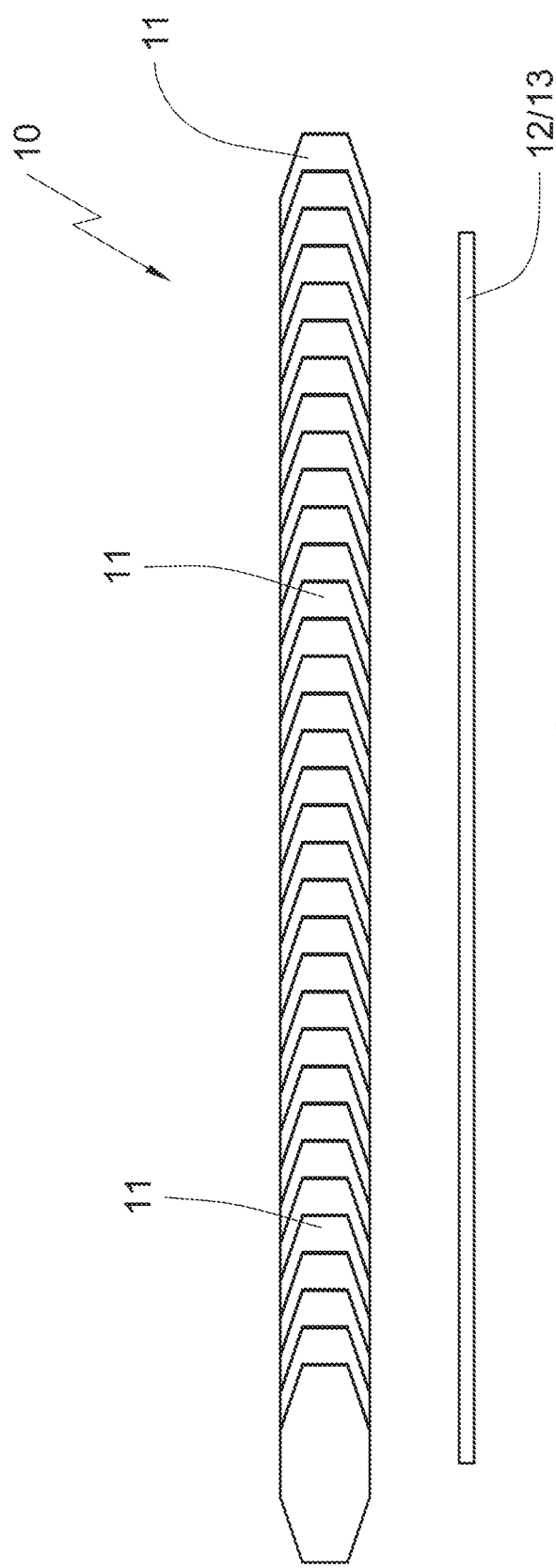
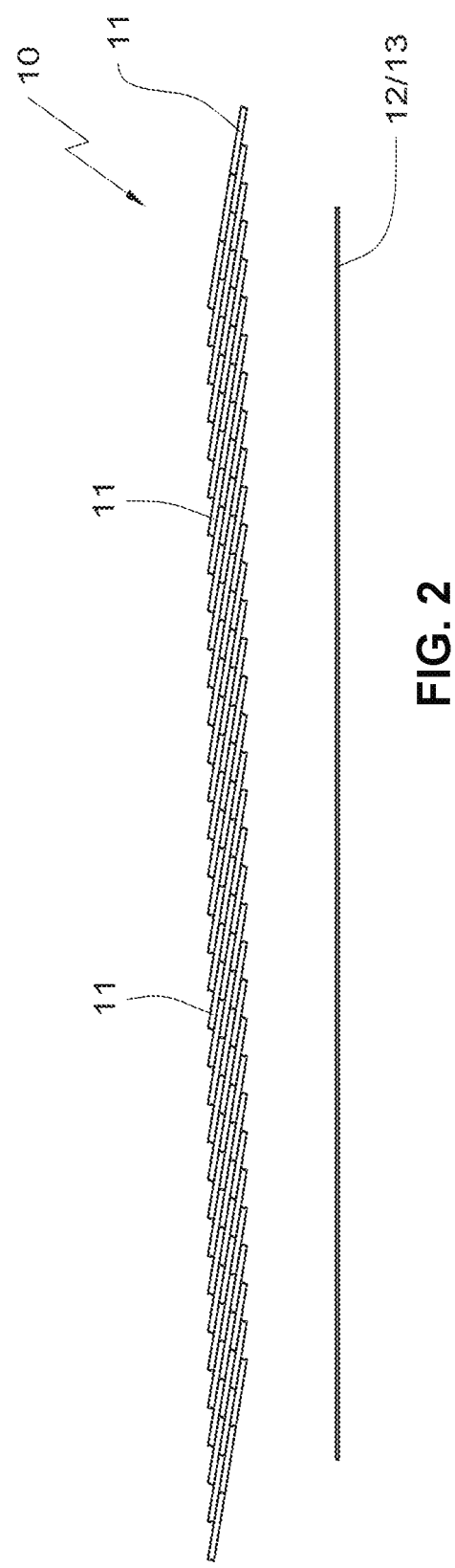
FIG. 1
FIG. 2

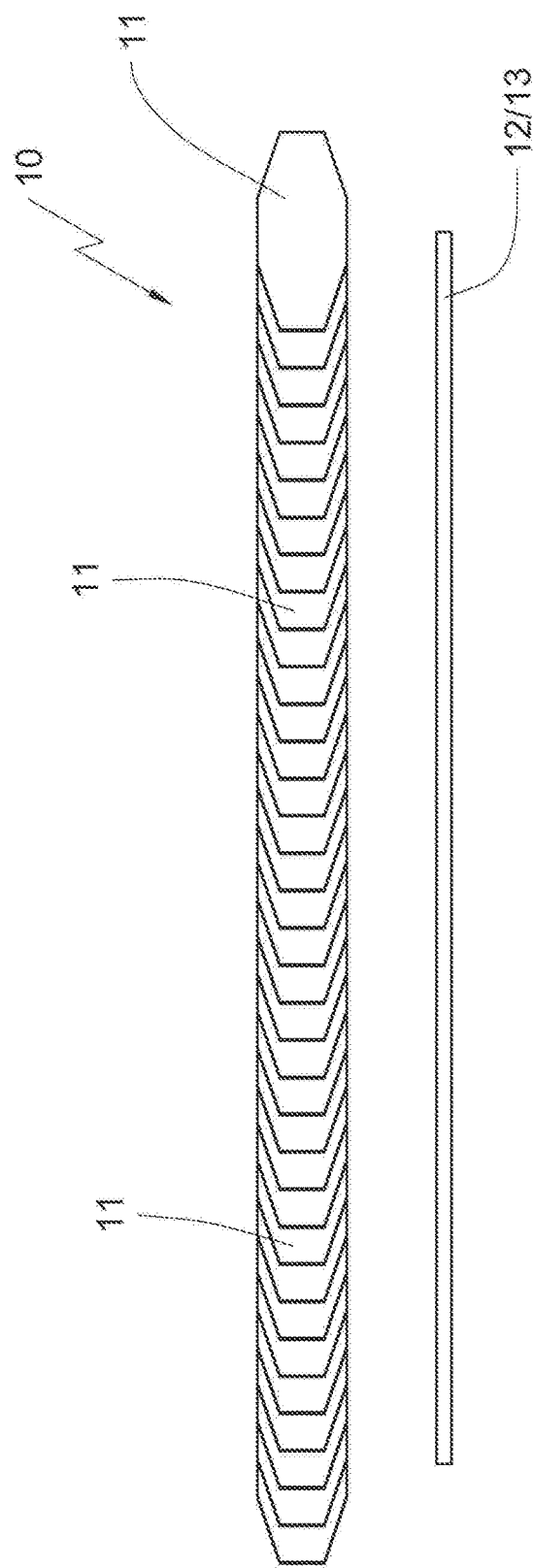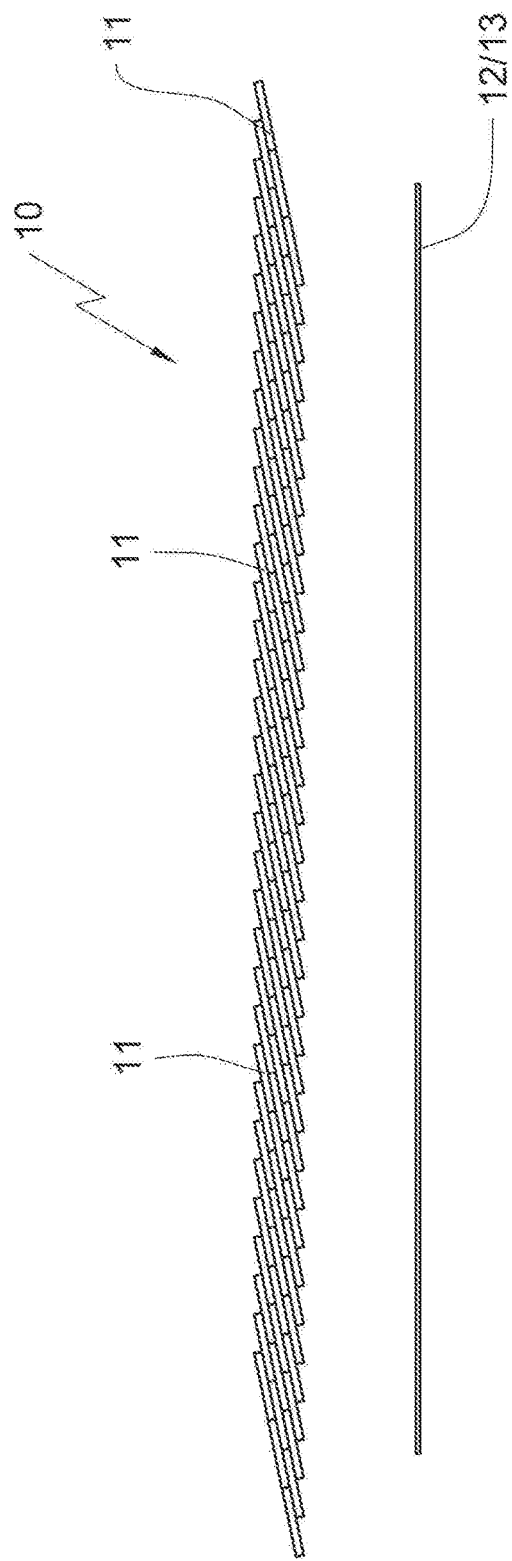
FIG. 3
FIG. 4

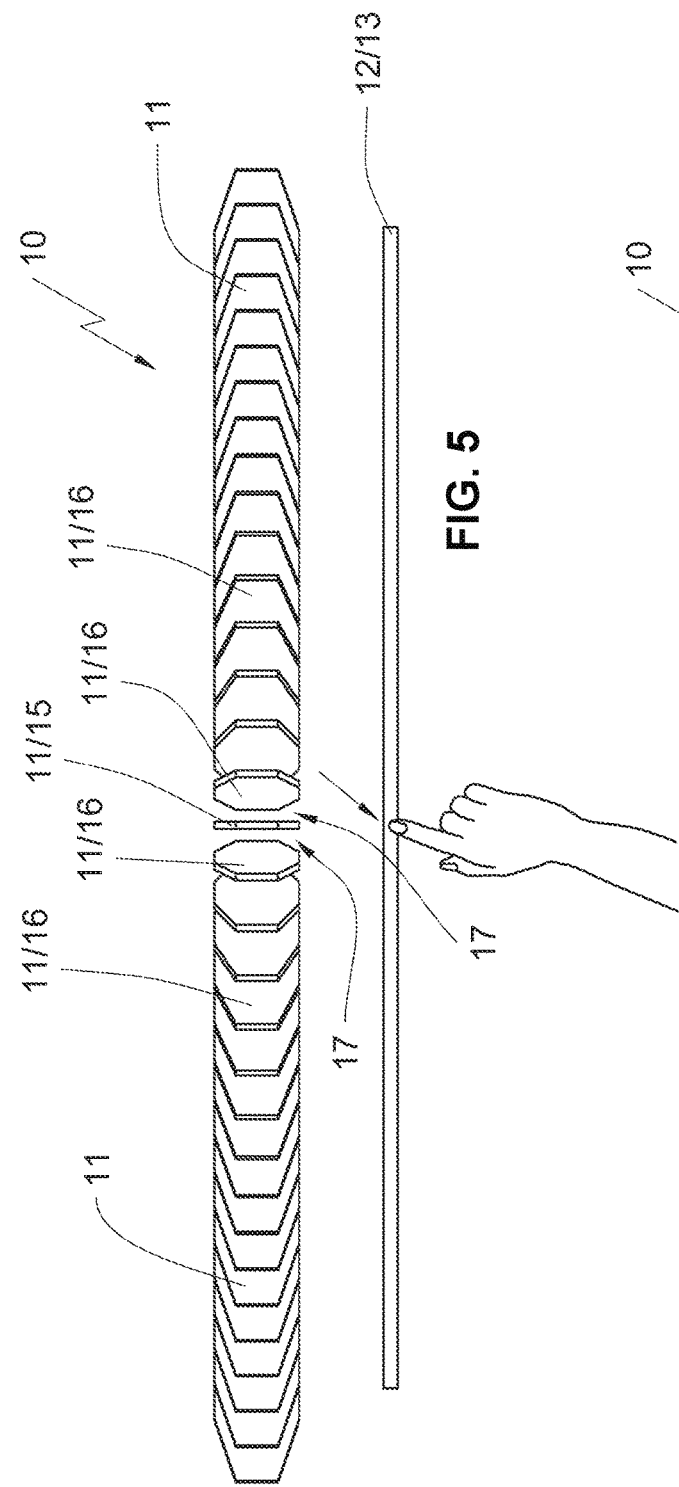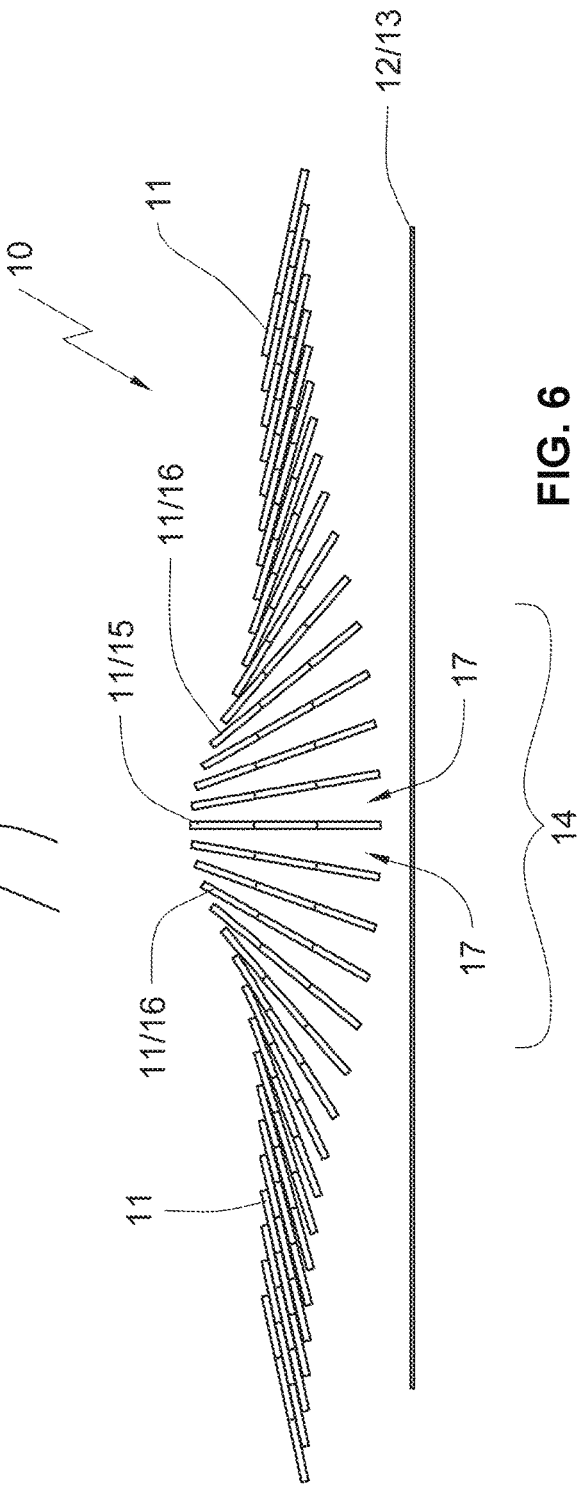

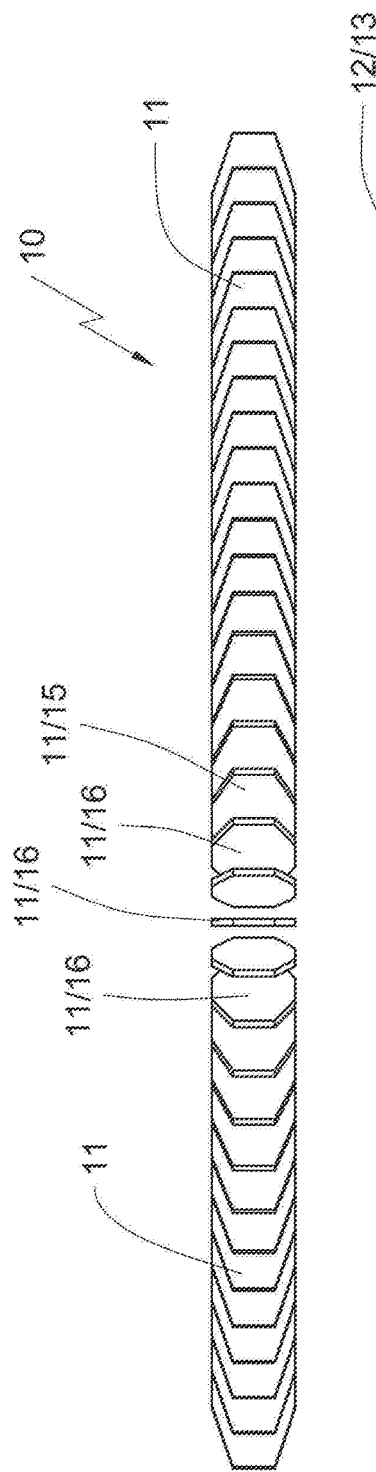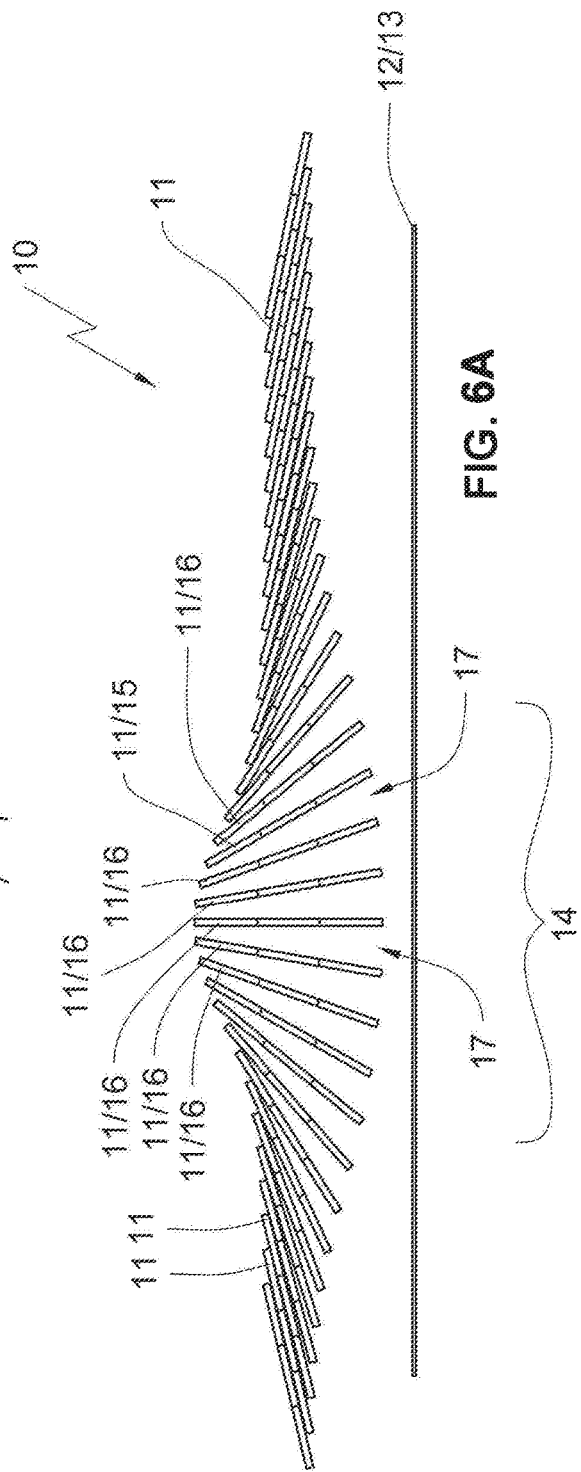

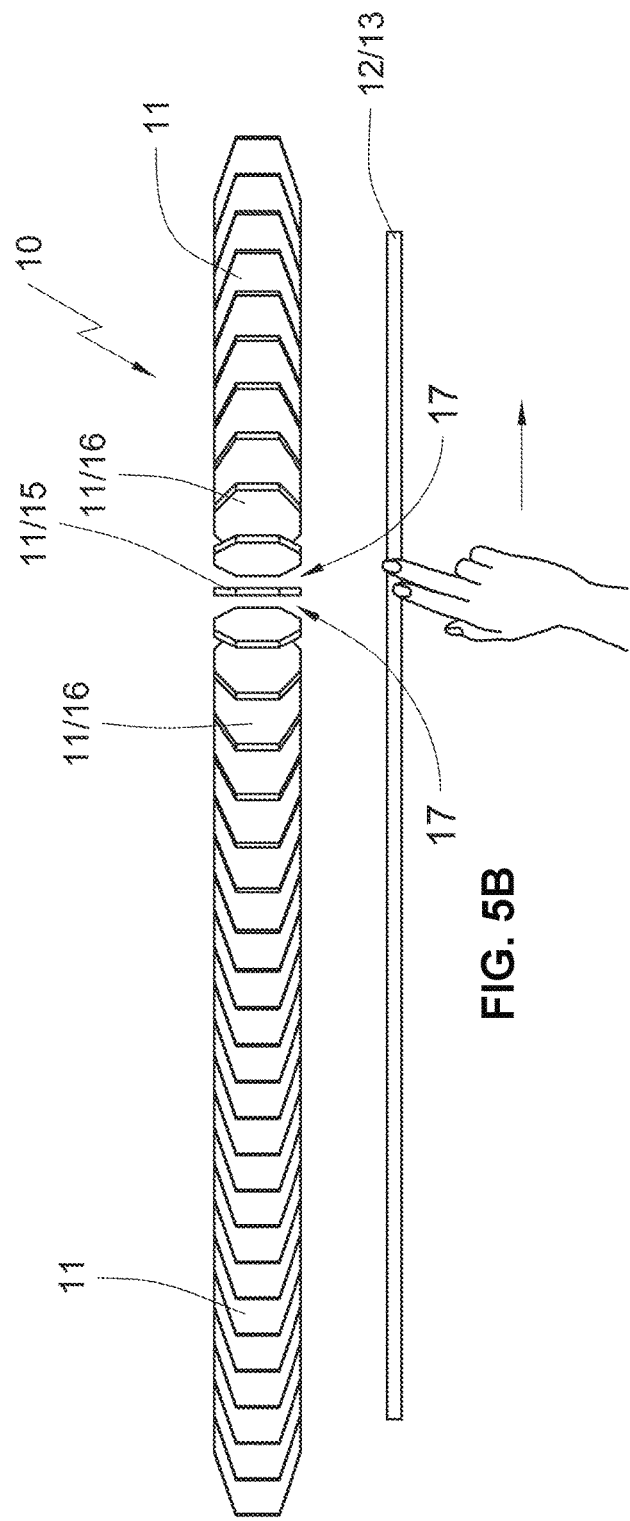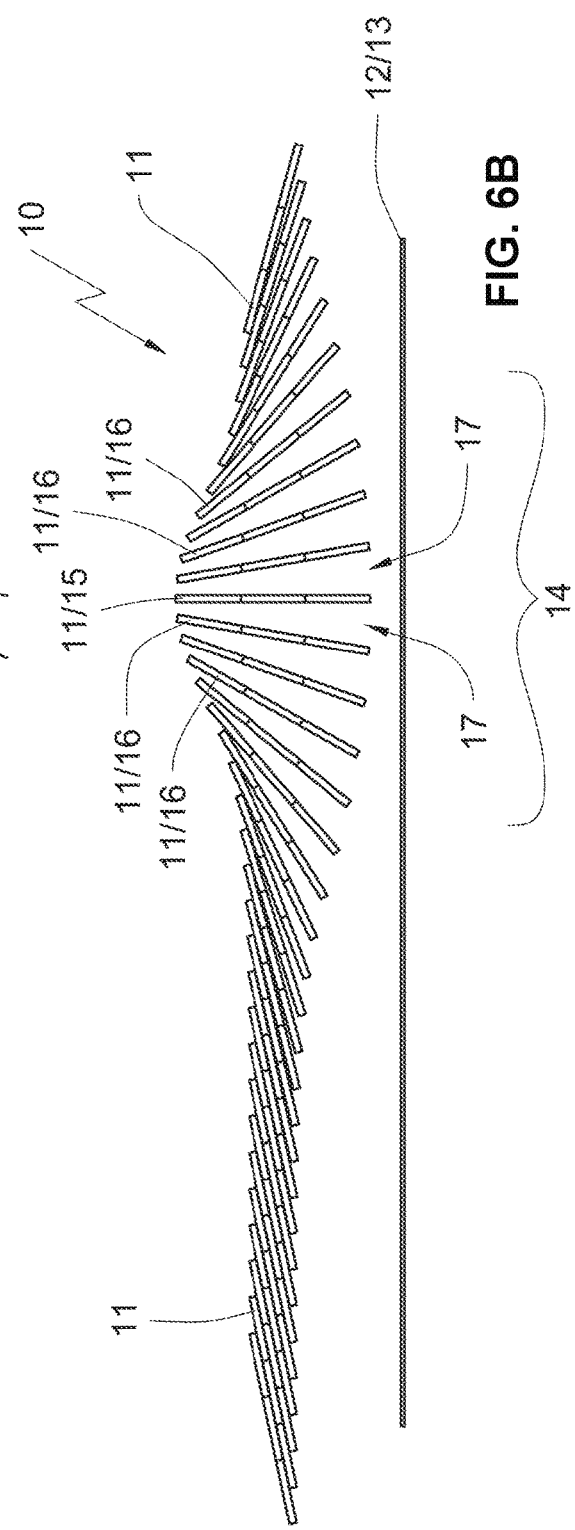

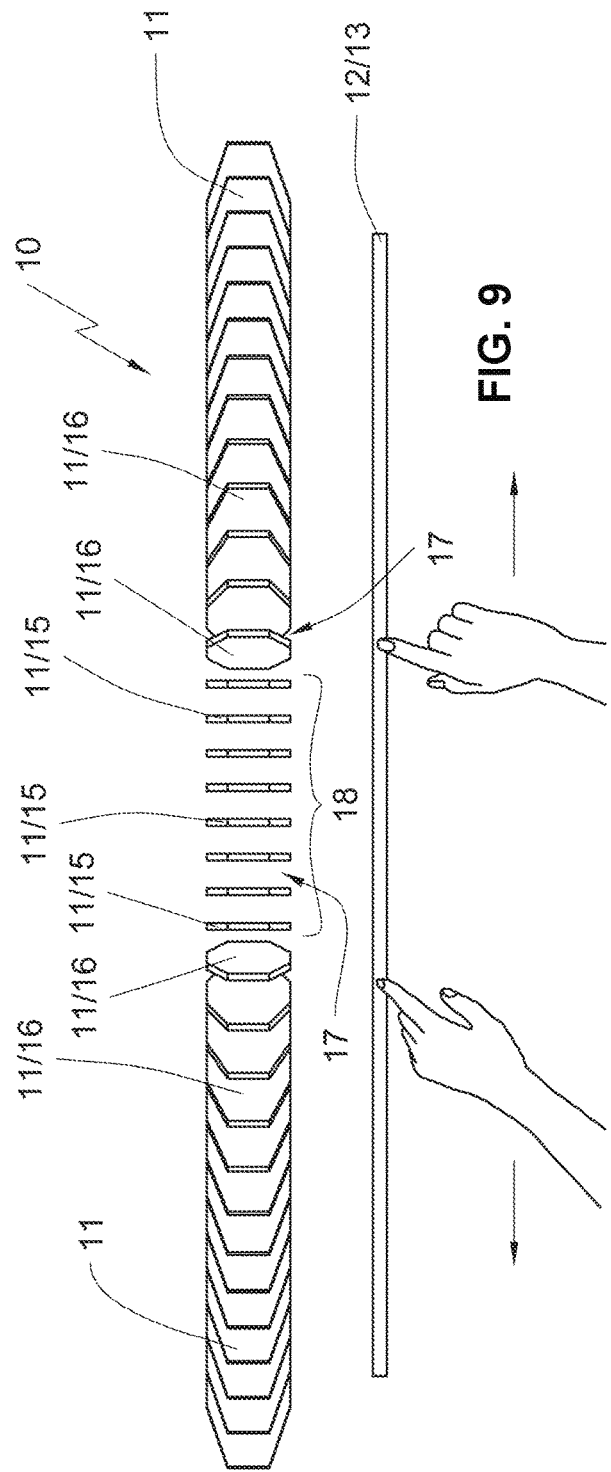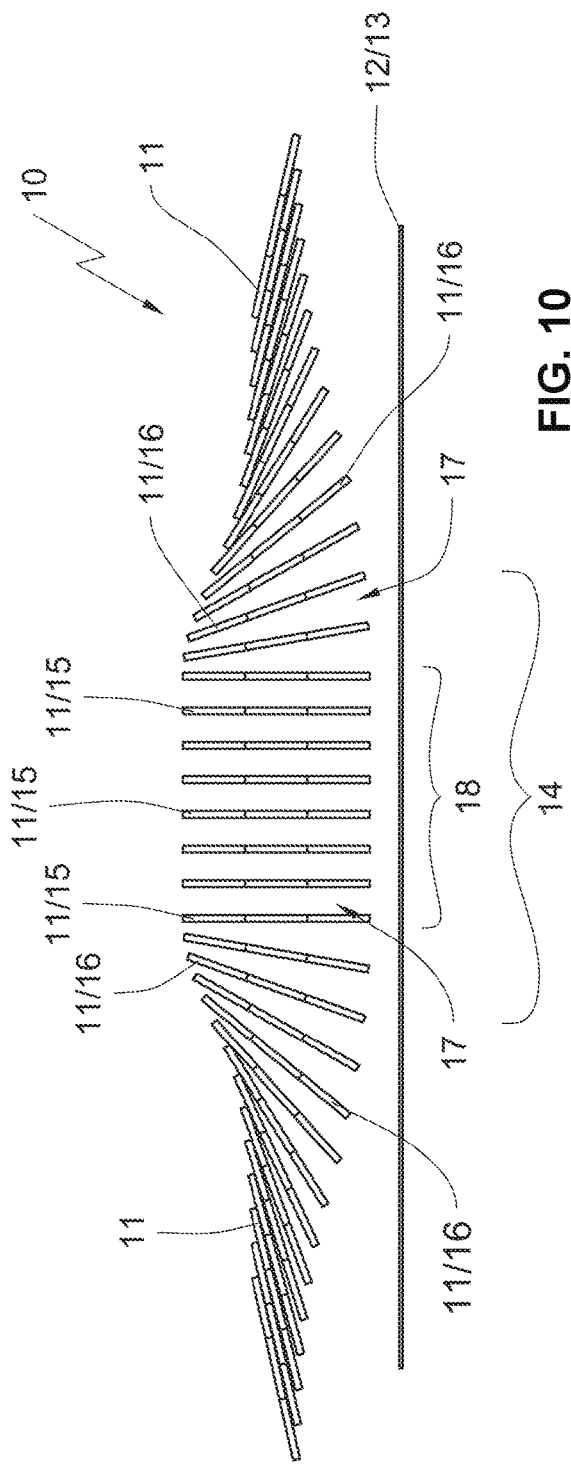

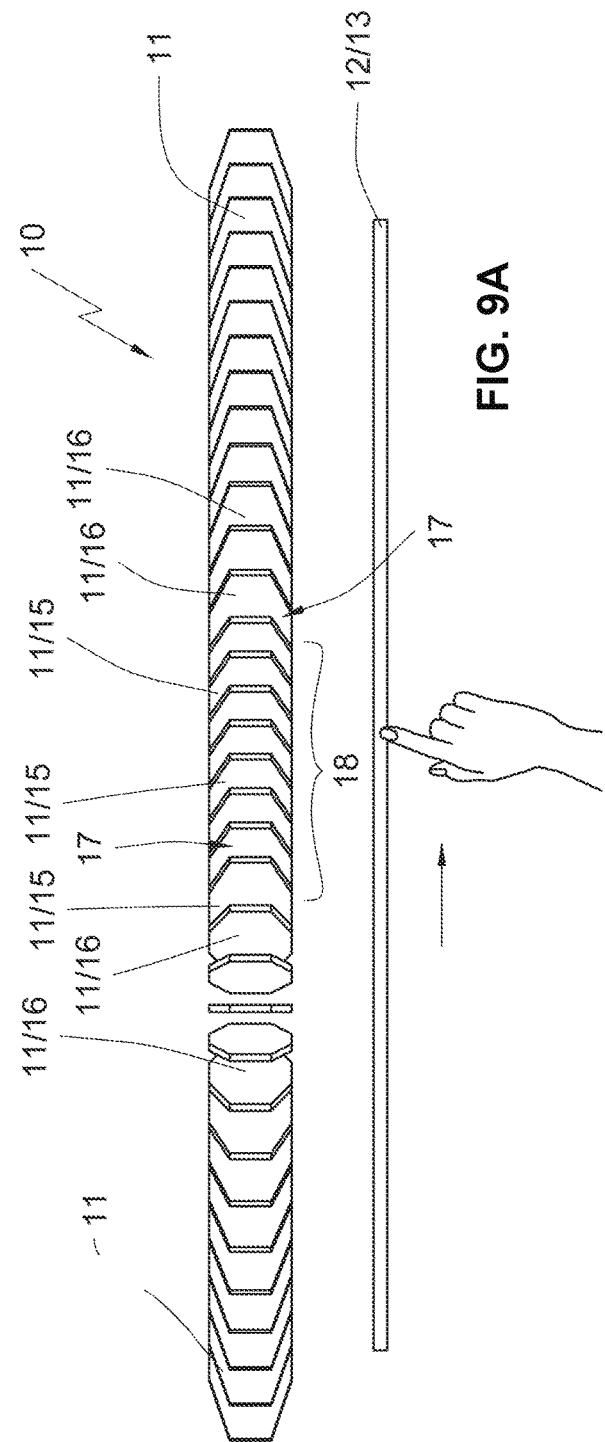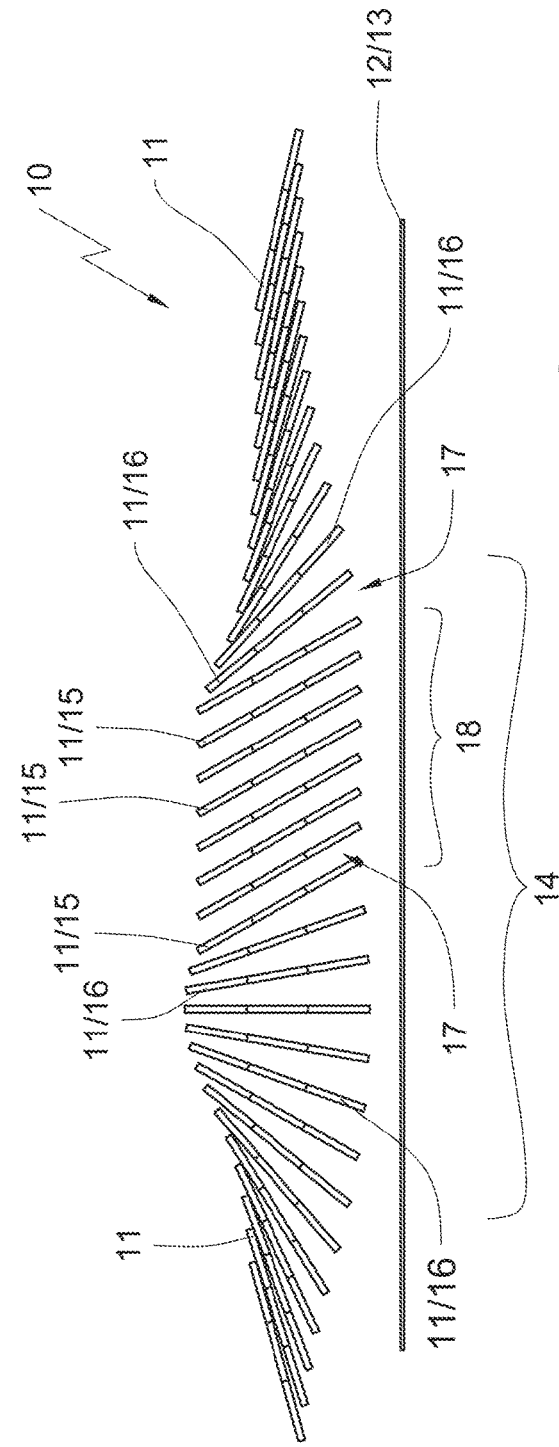

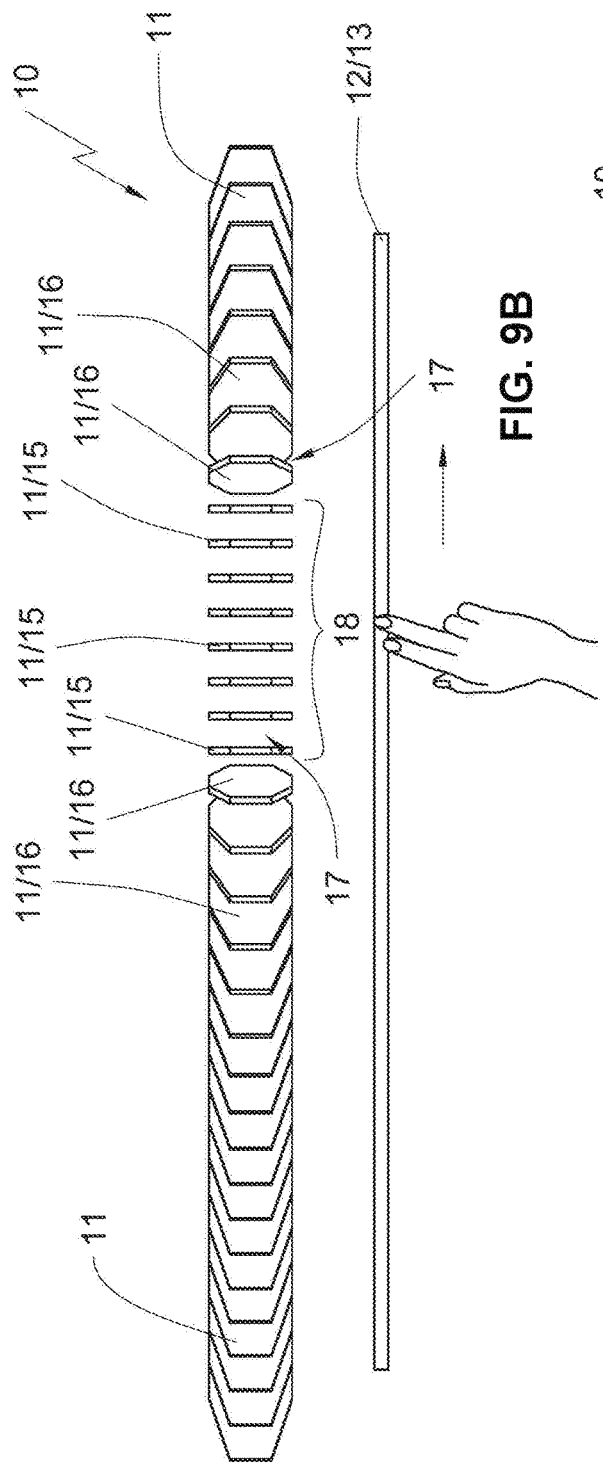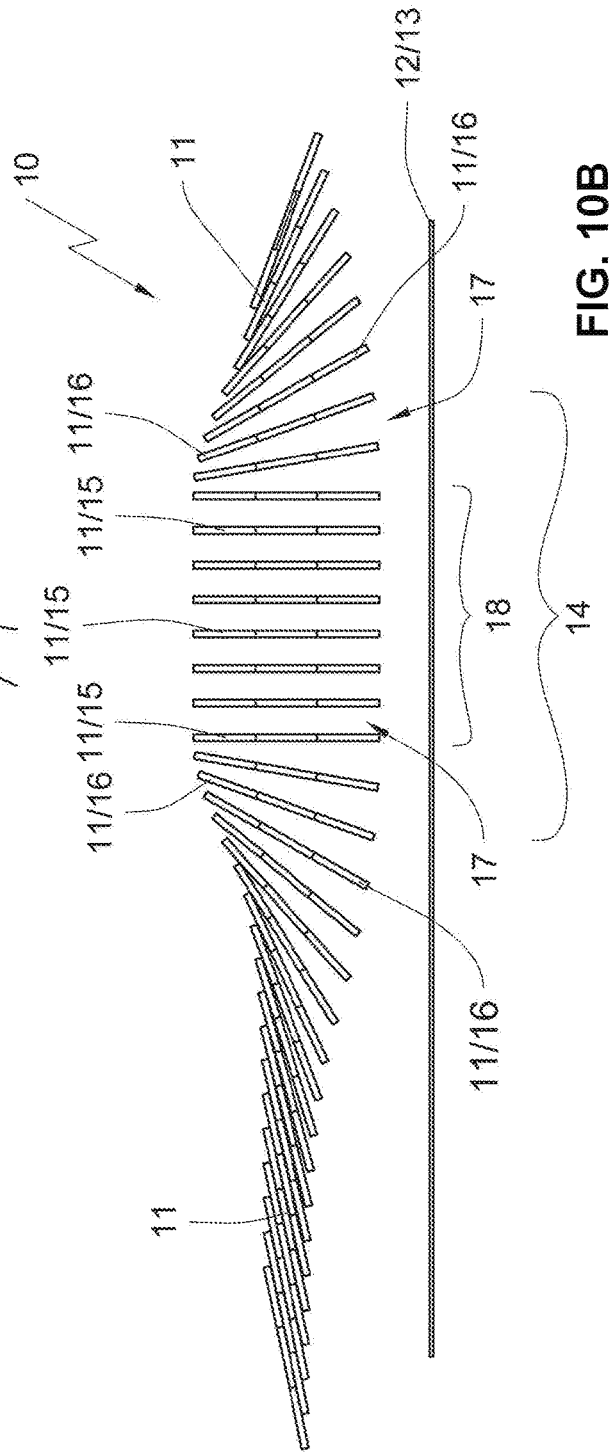

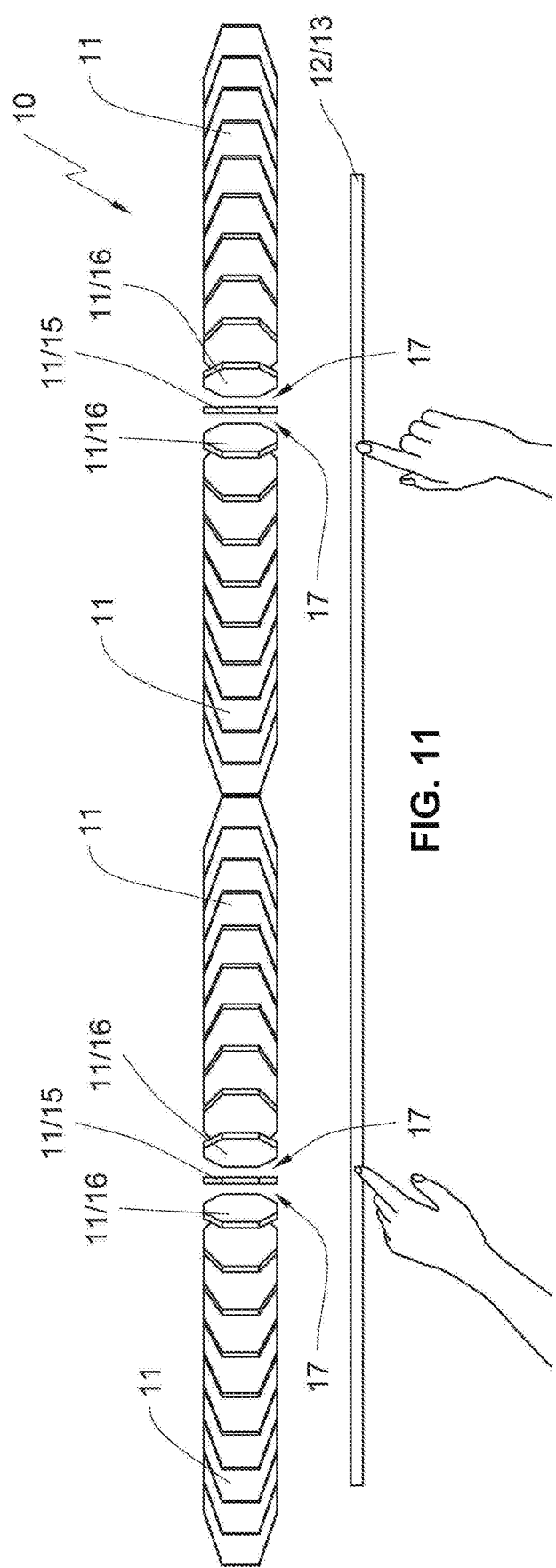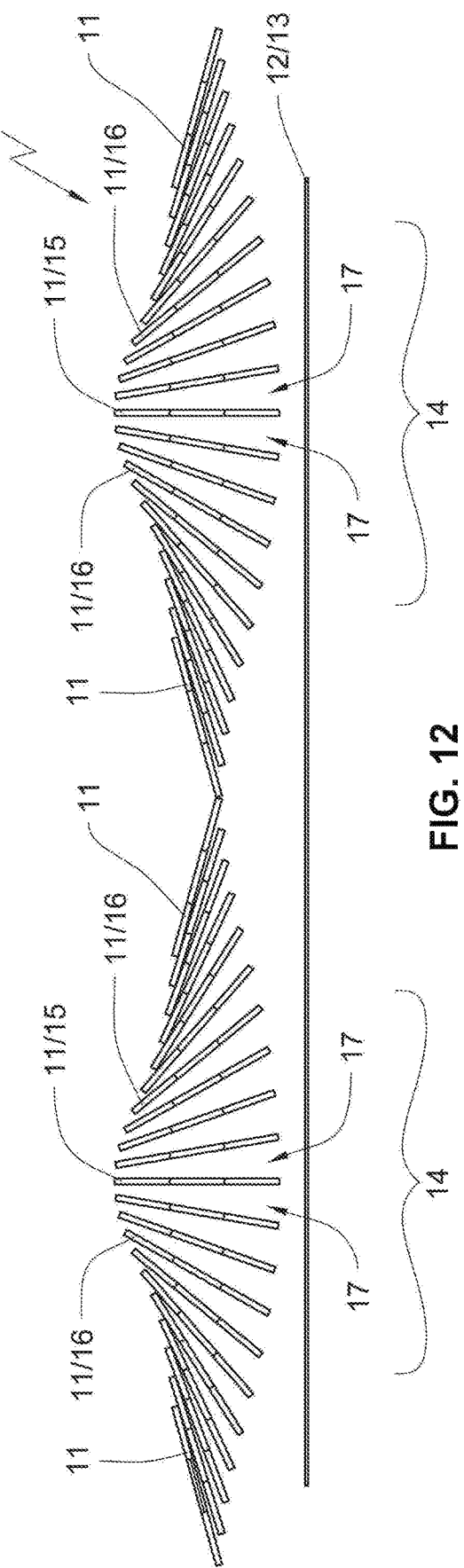

AIR VENTS FOR VEHICLE INTERIOR

RELATED APPLICATIONS

This application claims priority from and incorporates by reference German Patent Application DE 10 2017 120 208.0 filed on Sep. 1, 2017.

FIELD OF THE INVENTION

The invention relates to an air vent for vehicle interiors.

BACKGROUND OF THE INVENTION

Air vents for vehicle interiors are well known in the art. They are used for example in land vehicles, aircraft and water craft and in a series of other applications.

Air vents for vehicles, in particular cars are well known and described e.g. in DE 20 2014 103 672 U1. A housing enveloping an opening cross section is provided with lamellas that are vertically adjacent to each other and horizontally above each other. Each lamella is arranged pivotable about an axis. The horizontal lamellas are movement coupled with each other and the vertical lamellas are movement coupled with each other as well. At least one movement element is used to pivot the vertical and horizontal lamellas so that air flowing out through flow out gaps that are arranged between the lamellas is controllable with respect to its outflow direction.

Air that exists an air vent of this type is typically oriented so that persons that are in an outflow area can feel more or less of an air draft.

The problem of an air draft caused by oriented air flows has been addressed in DE 20 2016 103 388 U1. This document discloses an air vent which only has vertically oriented lamellas in this embodiment. The vertically oriented lamellas are movement coupled with each other and move into a pivot position where they are parallel to each other according to the basic function of the air vent when the vertically oriented lamellas are pivoted by the actuation element. This embodiment, however, also discloses that the lamellas can be pivoted by a second operating arrangement. This second operating arrangement is configured as a memory wire and moves the lamellas that are laterally offset from a center lamella. The lateral lamellas are oriented at increasing angles to the center lamella with a distance from the center lamella increasing. This forms a diffuse air flow. The center lamella of the outlet arrangement is formed by a master lamella wherein each adjacent slave lamella has a different angle relative to the master lamella. This way an angle between the master lamella and a respective slave lamella increases with increasing distance. Thus, the air vent illustrated in DE 20 2016 103 388 U1 is configured to generate a diffuse air flow instead of a directed air flow so that a draft is at least reduced, ideally completely prevented.

This advantageous property, however, is associated with the fact that the directed air flow as well as the diffuse air flow have a predetermined origin which corresponds to the flow center.

BRIEF SUMMARY OF THE INVENTION

Thus, it is an object of the invention to provide an air vent which provides a variable flow origin and an oriented and/or diffuse air flow.

The object is achieved by An air vent for a vehicle interior, the air vent including a master lamella and plural slave lamellas that are respectively pivotable about an axis, wherein the plural slave lamellas follow an opening movement of the master lamella and are arrangeable at different angles relative to the master lamella in order to generate a diffuse air flow; an open portion which is defined by a plurality of lamellas including the master lamella and the plural slave lamellas with a respective flow out gap arranged between each of the lamellas so that air moves through the respective flow out gap into the vehicle interior; and at least one actuation element that is configured to control an orientation of the lamellas, wherein any one of the lamellas is selectable as the master lamella wherein an opening movement of the plural slave lamellas follows an opening movement of the master lamella.

In a diffuse air flow formed by a generic air vent the typically centrally arranged master lamella forms the flow center. In an air vent that generates an oriented air flow the center lamella is considered the master lamella and marks the flow center and therefore has to be considered the master lamella per definition. The core idea of the invention is to make the master lamella freely selectable so that a position of a center of the air flow no matter whether oriented or diffuse becomes adjustable which facilitates increased ventilation comfort.

An embodiment with the features of dependent claim 1 is particularly advantageous. This embodiment is characterized in that orientations of slave lamellas that are arranged adjacent to the master lamella on both sides are opposite to each other, wherein a larger angle is enclosed between the master lamella and a respective slave lamella, the further the slave lamella is arranged from the master lamella until adjacent slave lamellas contact each other. The opposite orientation of the slave lamellas is provided in particular when the master lamella is oriented transversal to a longitudinal extension of the air vent.

Thus, is known in the art in principle that the slave lamellas that are arranged adjacent to the master lamella on both sides are oriented opposite to each other so that a closed no flow portion is defined in the air vent on both sides of the master lamella by slave lamellas that contact each other.

Thus, slave lamellas that contact each other form a closed portion of the air vent that has no flow out gaps.

Thus, an air vent of this type extends over a certain width for a vertical lamella arrangement or a certain height for a horizontal lamella arrangement and facilitates to define a specific flow out portion by selecting the lamellas, whereas an exiting of an oriented and/or diffuse air flow is prevented laterally from the flow out portion. This way the air flow can be oriented e.g. to a first user without simultaneously affecting a second user.

It is provided that the opening range is movable by the actuation element over a width of the air vent, wherein the open area is subjected to a corresponding lamella exchange for a constant number of lamellas.

It is an advantage of an air vent according to this embodiment that the opening range is movable quasi continuously over a width of the air vent. Thus, a center of the air flow can be moved to almost any point in space which achieves a substantial amount of comfort. Since moving the open area only causes a lamella exchange, however the number of lamellas defining the open area remains constant only the position of the center of the air flow changes, however the shape of the air flow defined by the open area does not change.

It is envisioned to make several lamellas selectable as master lamellas. This accomplishes that plural open portions are defined over the spatial range of the air vent either vertically and/or horizontally so that two or more air flows that are controllable independently from each other with respect to their position and orientation can exit from the air vent. It is also possible to move each of the open areas by the actuating element, wherein closed portions without flow out gaps can be provided between the open portions.

It is furthermore provided that the selected master lamellas are arranged adjacent to each other and two adjacent master lamellas are only offset from each other by an outlet gap wherein it is provided in particular that master lamellas that are arranged adjacent to each other form a master lamella bundle wherein the lamellas of the master lamella bundle are arranged parallel to each other. As a consequence the master lamella bundle will typically define a flow out portion within the open portion wherein air flows in a directed manner from the flow out portion into the interior.

It is an essential advantage of this embodiment that the open portion is variable with respect to its size or extension over the air vent extension by arranging plural master lamellas adjacent to each other. The open portion can thus be increased wherein the slave lamellas on both sides of the lamella bundle thus defined enclose an increasingly larger angle with the master lamella bundle with increasing distance from the master lamella bundle until adjacent slave lamellas contact each other and define a closed portion.

This way portions of the air vent can be configured without an outflow due to the closed portion even for an enlarged open portion so that passengers or vehicle areas remain unaffected by the air flow.

It is also provided for this embodiment that the open portion is movable along the width of the air vent by the actuation element wherein the open portion and in particular the lamella bundle exchanges (master) lamellas while keeping the same number of lamellas.

Thus, it is also provided for an enlarged open portion that the open portion is continuously movable over the spatial extension of the air vent.

It is eventually provided that the actuation element extends over a width of the air vent, in particular when the actuation element is a surface that is sensitive to touch.

This way a uniform actuation element is provided which fits quite esthetically into the dash board of a motor vehicle. Furthermore a uniform actuation of the air vent is assured.

BRIEF DESCRIPTION OF THE DRAWINGS

Further advantages and a better comprehension of the invention can be derived from the subsequent description of an embodiment, wherein:

FIG. 1 illustrates a lamella arrangement of an air vent according to the invention in a first closed position in a front view;

FIG. 2 illustrates the lamella arrangement according to FIG. 1 in a top view;

FIG. 3 illustrates an alternative lamella arrangement configured to implement a closed position of the air vent according to FIG. 1;

FIG. 4 illustrates a top view of the lamella arrangement according to FIG. 3;

FIG. 5 illustrates the air vent according to FIG. 1 with an open portion defined by selecting a master lamella in a front view;

FIG. 6 illustrates the lamella arrangement according to FIG. 5 in a top view;

FIG. 5A illustrates the lamella arrangement according to FIG. 5 with a pivoted master lamella;

FIG. 6A illustrates a top view of the lamella arrangement according to FIG. 5A;

FIG. 5B illustrates the lamella arrangement according to FIG. 5 with a moved open portion;

FIG. 6B illustrates the lamella arrangement according to FIG. 5B in a top view;

FIG. 9 illustrates a lamella arrangement according to FIG. 7 with a master lamella bundle including 8 master lamellas;

FIG. 10 illustrates a top view of the lamella arrangement according to FIG. 9;

FIG. 9A illustrates the lamella arrangement according to FIG. 9 with a pivoted master lamella bundle;

FIG. 10A illustrates a top view of the lamella arrangement according to FIG. 9A;

FIG. 9B illustrates the lamella arrangement according to FIG. 9 with a laterally moved open portion;

FIG. 10B illustrates a top view of the lamella arrangement according to FIG. 9B;

FIG. 11 illustrates the lamella arrangement of an air vent according to FIG. 1 with two master lamellas that are offset from each other by several lamellas wherein the master lamellas form two open portions that are offset from each other; and FIG. 12 illustrates a top view of the lamella arrangement according to FIG. 11.

DETAILED DESCRIPTION OF THE INVENTION

Figure 7:
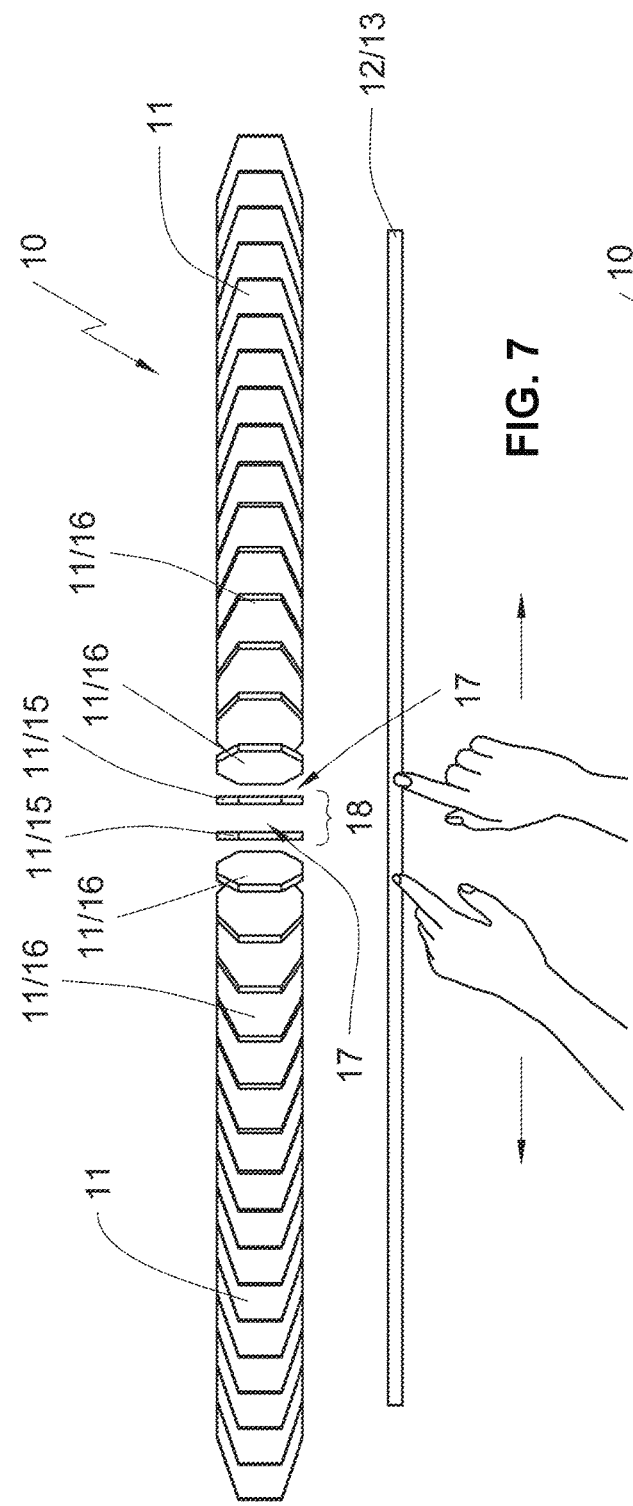
FIG. 7 illustrates a lamella arrangement of the air vent according to FIG. 1 with a lamella bundle that is formed by two master lamellas.

In the drawing figures the lamella arrangement of an air vent is overall designated with a reference numeral 10.

The lamella arrangement 10 includes a plurality of individual lamellas 11 wherein each individual lamella 11 is pivotable about a vertical axis that is not illustrated in the drawing figures. FIG. 1 illustrates an actuation element 12 adjacent to the lamella arrangement 10 with its individual lamellas 11 wherein the actuation element 12 extends parallel to the lamella arrangement 10 over a substantial width of the lamella arrangement 10. An actual length of the actuation element 12 that is measured parallel to the lamella arrangement 10 can deviate from the illustration. It is also conceivable to provide plural individual actuation elements 12 which only extend over a portion of the lamella arrangement 10. In an advantageous embodiment of the invention the actuation element 12 is configured as a surface 13 that is sensitive to touch.

FIGS. 1 and 2 have to be viewed together. In FIG. 1 individual lamellas 11 of the lamella arrangement 10 are pivoted to the right with respect to the paper plane and form a closed position in that the individual lamellas 11 are pivoted until they contact each other as evident from FIG. 2. In this closed position of the individual lamellas 11 the individual lamellas 11 contact each other without a flow out gap so that an air flow that flows through the lamellas 11 is blocked.

FIGS. 3 and 4 illustrate a lamella arrangement 10 that deviates from FIGS. 1 and 2. Also here a closed position is implemented. However, the lamellas 11 are pivoted to the left with respect to the paper plane until they contact each other without a flow out gap and an air passage between the individual lamellas 11 is blocked.

Figure 8:
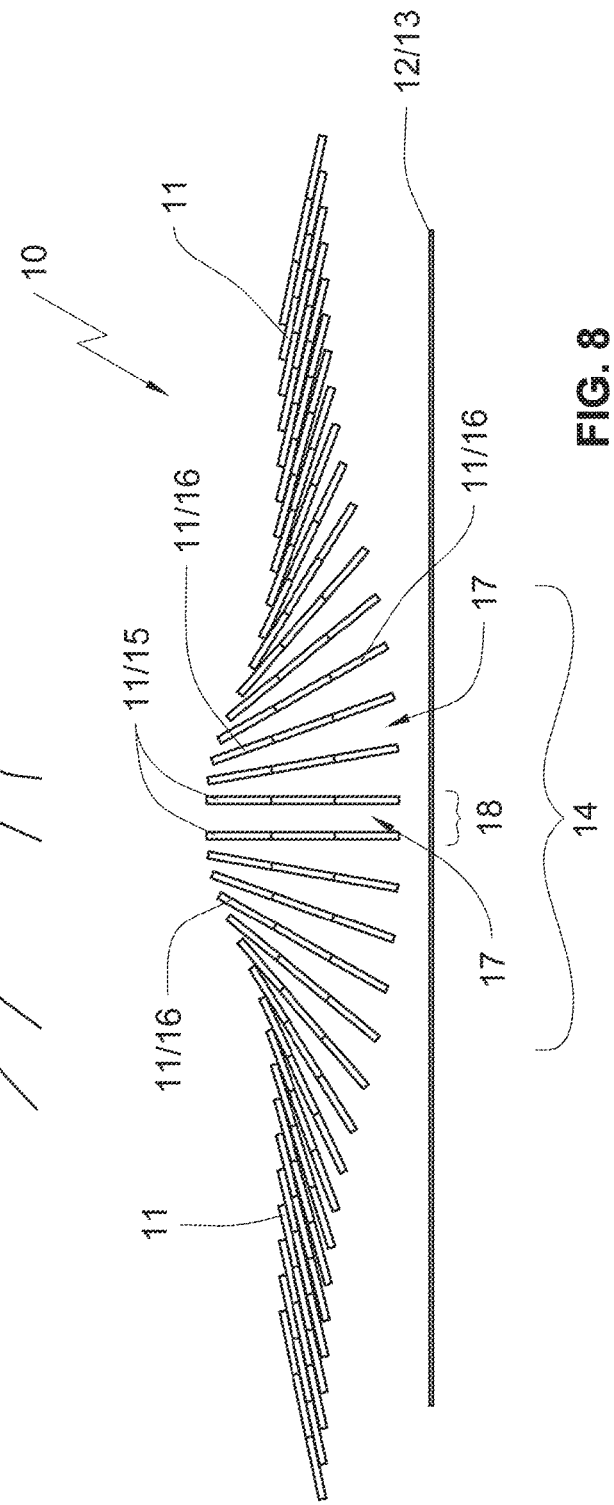
FIG. 8 illustrates a top view of the lamella arrangement according to FIG. 7.

A function of the air vent according to the invention, in particular a position of the individual lamellas 11 of the lamella arrangement 10 and the different configuration of open portions 14 which facilitate at least a partial pass through of the air flow are illustrated with reference to FIGS. 5-12. Reaching different lamella positions is independent from a closed position according to FIG. 1 or 2 or a closed position according to FIGS. 3 and 4 forming a starting point for the adjusted position of the individual lamellas 11.

FIG. 5 illustrates a front view and FIG. 6 illustrates the associated top view of the lamella arrangement 10. By using the actuation element 12, thus touching the touch sensitive surface with a finger at any point selects an individual lamella 11 that is most proximal to the touch as a so called master lamella 15. The master lamella 15 erects, wherein the so called slave lamellas 16 which are adjacent on a right side and a left side of the master lamella 15 also erect following the opening movement of the master lamella 15. The position change of the master lamella 15 and of the slave lamellas 16 is performed by corresponding pivoting about a non-illustrated pivot axis. Thus, flow out gaps 17 are formed between a predetermined number of lamellas 15/16 so that ventilation air can enter from a space arranged behind the lamella arrangement 10 into a space arranged in front of the lamella arrangement 10.

As evident from FIGS. 5 and 6 only a limited number of individual lamellas 11 configured as a master lamella 15 with adjacent slave lamellas 16 forms the open portion 14. On both sides a section with individual lamellas 11 in a closed position adjoins, wherein the individual lamellas contact each other without a flow out gap and contrary to the open portion 14 prevent air from passing through. Thus, a ventilation air flow is limited to a predetermined portion of a space arranged downstream of the lamella arrangement 10.

In FIGS. 5 and 6 the slave lamellas 16 have different angles relative to the master lamella 15. With an increasing distance from the master lamella 15 an angle that is enclosed between the master lamella 15 and the respective slave lamella 16 increases. Thus, the angle between the individual lamellas 15/16 can be constant respectively. The angle between the individual lamellas 15/16, however, can also vary. In the illustrated embodiment, however, it is also evident that slave lamellas 16 that are arranged on both sides of the master lamella 15 respectively have an opposite angle. Overall the lamella arrangement in the open portion has the effect that a diffuse air flow exits the lamella arrangement 10 which reduces or eliminates a perceived draft.

In particular from comparing the top view according to FIG. 6 with FIGS. 1, 2, 3 and 4 it is evident that starting from a completely closed position of the lamella arrangement 10 an individual lamella section that is adjacent to the selected master lamella 15 in this embodiment as well as in the other embodiments has to pivot from a left or right contact position into the opposite position.

FIGS. 5A and 6A now illustrate the effect upon the lamella arrangement 10 when the master lamella 15 that is arranged in FIGS. 5 and 6 in a central position is moved with respect to the paper plane by pivoting to the right. Pivoting the master lamella 15 to the right has the effect that the right side slave lamellas 16 are pivoted until they reach a closed position and slave lamellas 16 that are arranged on the left with respect to the paper plane also pivot to the right wherein a width of the open portion 14 remains constant in this embodiment. Accordingly individual lamellas 11 that are arranged on a right side of the master lamella 15 erect from their closed position into an open position and thus become slave lamellas 16. Thus the open portion 14 moves slightly.

The pivoting of the master lamella 15 to the right that is illustrated in FIGS. 5A and 6A causes a movement of the open portion 14 to the left compared to the non-pivoted master lamella 15 according to FIGS. 5 and 6.

In a different non-illustrated pivoting arrangement of the master lamella 15 it is conceivable that the number of the individual lamellas 11 arranged on the left side and on the right side that are defined as slave lamellas 16 by selecting the master lamella 15 does not change. Then pivoting the master lamella to the right has the effect that slave lamellas 16 that are arranged on a right side of the master lamella 15 move into a closed position that is analogous to FIG. 6A. Since only a number of lamellas pivots on the left side of the master lamella 15 which has already been previously defined as slave lamellas 16 and none of the individual lamellas 11 that are in the closed position move in the opening direction the open portion 14 becomes narrower in this case. Therefore the previously described migration of the open portion 14 to the left does not occur.

Also the representation of the lamella arrangement 10 in FIGS. 5B and 6B has to be viewed with reference to the previously described FIGS. 5 and 6.

FIGS. 5B and 6B in turn illustrate a front view of the lamella arrangement 10 and a top view of the lamella arrangement 10. This embodiment shows how the actuation element 12 or the touch sensitive surface 13 and an alternative actuation method (2 fingers instead of one finger) moves the open portion 14 along the longitudinal extension of the lamella arrangement 10. The number of lamellas which defines the open portion is constant. However a constant lamella exchange occurs during the movement. Each lamella 16/11 that closes against the movement direction is replaced by an opening lamella 11/16 that is in front in the movement direction.

The essential difference for (easy) movement of the open portion 14 when pivoting the master lamella 15 according to the description of FIGS. 5A and 6A is that also the master lamella 15 is affected by the continuous lamella exchange and thus the open portion 14 can be moved from one end of the lamella arrangement 10 to another end of the lamella arrangement 10. Contrary thereto due to the master lamella 15 being invariably defined in FIGS. 5A and 6A only a slight offset of the open portion 14 is possible either on the right side or the left side of the master lamella 15.

The invention also facilitates to define several individual lamellas 11 simultaneously as a master lamella 15 through the touch sensitive surface 13 or one or plural actuation elements 12. In FIGS. 7-10 this is implemented in that two lamellas 15/16 that are only offset by a flow out gap 17 are selected with a respective finger of a respective hand so that the two selected master lamellas 15 assume a parallel position relative to each other. A respective movement of the fingers in opposite direction facilitates defining a plurality of individual lamellas 11 as master lamellas 15 as illustrated in FIGS. 9 and 10. Also here all master lamellas 15 assume a parallel position relative to each other so that adjacent master lamellas 15 that are only offset by a flow out gap 17 form a master lamella bundle 18. According to the description regarding the preceding representations slave lamellas are arranged on both sides of each master lamella bundle 18 wherein the slave lamellas follow the opening movement, thus follow the respective position of the master lamella 15 of the master lamella bundle 18. Selecting plural master lamellas 15 and bundling them facilitates expanding the open portion 14 in FIGS. 7-10 so that a predetermined space downstream of the lamella arrangement 10 can be supplied with a larger amount of ventilation air. Additionally the parallel orientation of the master lamellas 15 in the master lamella bundle 18 leads to an oriented air flow in the downstream portion.

When only the open portion 14 shall be enlarged without an oriented air flow being desired a lamella arrangement 10 can be used in particular when using a touch sensitive surface using a different actuation method which only uses one master lamella 15 but which increases a number of laterally arranged slave lamellas 16. This increases the open portion 14, the angular orientations that respectively deviate from the master lamella 15, however, lead to a diffuse air flow over the enlarged open portion 14.

FIGS. 9A and 10A as well as 9B and 10B are analogous to FIGS. 5A and 6A as well as 5B and 6B. In FIGS. 9A and 10A the master lamella bundle 18 is pivoted to the right by the actuation element 12 or a corresponding actuation movement on the touch sensitive surface 13, wherein a width of the open portion 14 is not reduced by opening previously closed individual lamellas 11. As stated supra also here there is the option that is not illustrated in the figures to reduce the open portion 14 in size by the pivoting in that an additional opening movement of individual lamellas 11 that were previously in a closed position is omitted.

FIGS. 9B and 10B on the other hand side show the movement of the open portion 14 over the longitudinal extension of the lamella arrangement 10, wherein according to the movement a continuous lamella exchange is performed, in particular the lamella bundle 18 goes through a lamella exchange with the number of lamellas remaining constant.

FIGS. 11 and 12 in turn in front view and top view of a lamella arrangement 10 illustrate another variant of the invention with more than one defined master lamella 15. Herein two master lamellas 15 are selected by the actuation element 12 or the motion sensitive surface 13 wherein the two master lamellas respectively have slave lamellas 16 on both sides and are offset from each other at least by the slave lamellas 16. Additionally also additional individual lamellas 11 can be in the closed position between both master lamellas 15. This way it is possible to define two, generally more than two open portions 14 that are arranged at different positions distributed over the longitudinal extension of the lamella arrangement 10. Each of this open portions 14, however, can be configured according to the embodiments illustrated in FIGS. 5-10 or the embodiments that are only described but not illustrated. Thus, it is also possible to pivot the master lamella 16 while maintaining a width of the open portion 14 or while reducing the width of the open portion 14. It is possible to displace any open portion 14 in FIGS. 11 and 12 independently from each other over a longitudinal extension of the lamella arrangement 10. It is also conceivable to associate additional master lamellas 15 in the form of a master lamella bundle 18 with one or both or plural open portions 14 in order to expand the respective open portion 14. By the same token it is possible to expand the open portion 14 with additional slave lamellas 16 while maintaining a diffuse air flow.

It is provided that an input of the operator triggers a feedback in addition to adjusting the lamella arrangement 10 wherein the feedback is performed by optical and tactile signals. This feedback can be a singular feedback confirming the input or confirming the adjusted lamella arrangement 10. However, it is also possible to let the feedback continue for the time period of the adjustment process in order to signal the adjustment process by itself. For the feedback initially signal elements, either optical or tactile, can be used in the portion of the actuation element. However, it is also useful to indicate the current condition of the lamella arrangement 10 at least optically through a separate display or to render it triggerable through the display. In particular it is provided to be able to display the condition of the lamella arrangement 10 by corresponding symbols or by a realistic representation on a screen that supports the actuation.

For the sake of completeness it is appreciated that the invention was illustrated with reference to an air vent whose lamella arrangement 10 only includes vertically oriented lamellas 11. Without a change of principle also a horizontal lamella arrangement can be implemented. It is also conceivable to configure an air vent with a combination of horizontal and vertical lamellas.

It is an essential advantage of the invention that selecting any individual lamella as a master lamella 15 renders the open portion 14 with its out flow gaps 17 positionable at any position of the air vent, wherein adjacent portions can be closed. In particular for air vents with significant width or height this is advantageous. Furthermore it was shown that plural open portions 14 can be defined by selecting plural master lamellas 15 which are additionally variable with respect to their width. It has been shown that oriented and diffused air flows are implementable by the different opening widths of the open portions 14. This operating concept is advantageous in particular for air vents which extend transversally over a considerable or even an entire width of the dash board of a car or of another vehicle. It is also conceivable to arrange an air vent in a car in a portion of the roof edge starting at the A-column and extending towards the rear or to configure it e.g. in the vehicle roof over its width. This can not only increase comfort. It can also have considerable advantages from a configuration point of view since fewer feed conduits are required that lead to larger but variably usable air vents, whereas smaller individual air vents typically require an individual air feed.

REFERENCE NUMERALS AND DESIGNATIONS 10 lamella arrangement
11 individual lamella
12 actuation element
13 touch sensitive surface
14 open portion
15 master lamella
16 slave lamella
17 flow out gap
18 master lamella bundle

What is claimed is:

1. An air vent for a vehicle interior, the air vent comprising:
 a master lamella and plural slave lamellas that are pivotable about their own respective axes, wherein the plural slave lamellas follow an opening movement of the master lamella and are arrangeable at different angle relative to the aster lamella in order to generate a diffuse air flow;
 an open portion which is defined by a plurality of lamellas including the master lamella and the plural slave lamellas with a respective flow out gap arranged between each of the lamellas so that air moves through the respective flow out gap into the vehicle interior; and
 at least one actuation element that is configured to control an orientation of the lamellas, wherein any one of the lamellas is selectable as the master lamella wherein an opening movement of the plural slave lamellas follows an opening movement of the master lamella, wherein slave lamellas that are arranged on opposing sides of the master lamella are oriented opposite to each other, and wherein an angle between the master lamella and a respective slave lamella increases, the further the respective slave lamella is arranged from the master lamella until adjacent slave lamellas contact each other.

2. The air vent according to claim 1, wherein slave lamellas that contact each other define a closed portion without a flow out gap.

3. The air vent according to claim 1, wherein the open portion is movable by the actuation element over a width of the air vent, and wherein lamella in the open portion that can switch direction are exchanged with lamella not in the open portion so that a number of the lamella in the open portion remains constant.

4. The air vent according to claim 1, wherein plural lamellas are selectable as master lamellas.

5. The air vent according to claim 4, wherein the master lamellas are arranged adjacent to each other and two adjacent master lamellas are only offset from each other by a respective flow out gap.

6. The air vent according to claim 5, wherein the master lamellas that are adjacent to each other form a master lamella bundle, and wherein the master lamellas of the master lamella bundle are oriented parallel to each other.

7. The air vent according to claim 6, wherein the lamella bundle defines a flow out portion within the open portion, and wherein the air flows into the vehicle interior from the flow out portion.

8. The air vent according to claim 1, wherein the at least one actuation element extends over a width of the air vent.

9. The air vent according to claim 8, wherein the actuation element is a touch sensitive surface.

10. An air vent for a vehicle interior, the air vent comprising:

a master lamella and plural slave lamellas that are pivotable about their own respective axes, wherein the plural slave lamellas follow an opening movement of the master lamella and are arrangeable at different angles relative to the master lamella in order to generate a diffuse air flow;

an open portion which is defined by a plurality of lamellas including the master lamella and the plural slave lamellas with a respective flow out gap arranged between each of the lamellas so that air moves through the respective flow out gap into the vehicle interior; and at least one actuation element that is configured to control an orientation of the lamellas, wherein any one of the lamellas is selectable as the master lamella wherein an opening movement of the plural slave lamellas follows an opening movement of the master lamella, wherein plural lamellas are selectable as master lamellas, wherein the master lamellas are arranged adjacent to each other and two adjacent master lamellas are only offset from each other by a respective flow out gap, wherein the master lamellas that are adjacent to each other form a master lamella bundle, wherein the master lamellas of the master lamella bundle are oriented parallel to each other, wherein the open portion is movable by the actuation element over a width of the air vent, and wherein lamella in the lamella bundle are exchanged with lamella not in the lamella bundle so that a number of the lamella in the lamella bundle remains constant.

11. An air vent for a vehicle interior, the air vent comprising:

a master lamella and plural slave lamellas that are pivotable about their own respective axes, wherein the plural slave lamellas follow an opening movement of the master lamella and are arrangeable at different angles relative to the master lamella in order to generate a diffuse air flow;

an open portion which is defined by a plurality of lamellas including the master lamella and the plural slave lamellas with a respective flow out gap arranged between each of the lamellas so that air moves through the respective flow out gap into the vehicle interior; and at least one actuation element that is configured to control an orientation of the lamellas, wherein any one of the lamellas is selectable as the master lamella wherein an opening movement of the plural slave lamellas follows an opening movement of the master lamella, wherein plural lamellas are selectable as master lamellas, wherein each selected master lamella together with adjacent slave lamellas provides the open portion, wherein the open portion is configured so that slave lamellas that are arranged on opposing sides of the master lamella are oriented opposite to each other, and wherein an angle between the master lamella and a respective slave lamella increases, the further the respective slave lamella is arranged from the master lamella until adjacent slave lamellas contact each other.

12. The air vent according to claim 11, wherein the open portion is movable by the actuation element so that the open portion is movable by the actuation element over a width of the air vent, and wherein lamella in the open portion are exchanged with lamella not in the open portion so that a number of the lamella in the open portion remains constant.

* * * * *